J. F. & R. W. WITTEMANN.
APPARATUS FOR CHARGING LIQUIDS WITH GAS.
APPLICATION FILED AUG. 6, 1914.

1,155,983.

Patented Oct. 5, 1915.
2 SHEETS—SHEET 2.

UNITED STATES PATENT OFFICE.

JACOB F. WITTEMANN AND RUDOLPH W. WITTEMANN, OF NEW YORK, N. Y., ASSIGNORS TO AMARANTH MACHINERY AND SUPPLY WORKS, INC., OF NEW YORK, N. Y., A CORPORATION OF NEW YORK.

APPARATUS FOR CHARGING LIQUIDS WITH GAS.

1,155,983.      Specification of Letters Patent.      Patented Oct. 5, 1915.

Original application filed May 27, 1912, Serial No. 700,029. Divided and this application filed August 6, 1914. Serial No. 855,410.

*To all whom it may concern:*

Be it known that we, JACOB F. WITTEMANN and RUDOLPH W. WITTEMANN, citizens of the United States, and residents of New York city, borough of Brooklyn, in the county of Kings and State of New York, have invented certain new and useful Improvements in an Apparatus for Charging Liquids with Gas, of which the following is a specification.

This application is a divisional application of our original application Serial No. 700,029 filed May 27, 1912, for an apparatus for charging liquids with gas.

This invention relates to certain new and useful improvements in apparatus for charging liquids with gas.

The object of our invention is to provide a new and improved apparatus for automatically commingling gas with a liquid, both separately conducted to the apparatus and delivered commingled by the apparatus, the differences in pressure, in the stream of liquid delivered by the apparatus, between two parts of a chamber of variable area in cross section being utilized for the purpose of controlling the apparatus and insuring uniform mixture of gas and liquid.

In the accompanying drawings one embodiment of our apparatus is shown.

Figure 1:
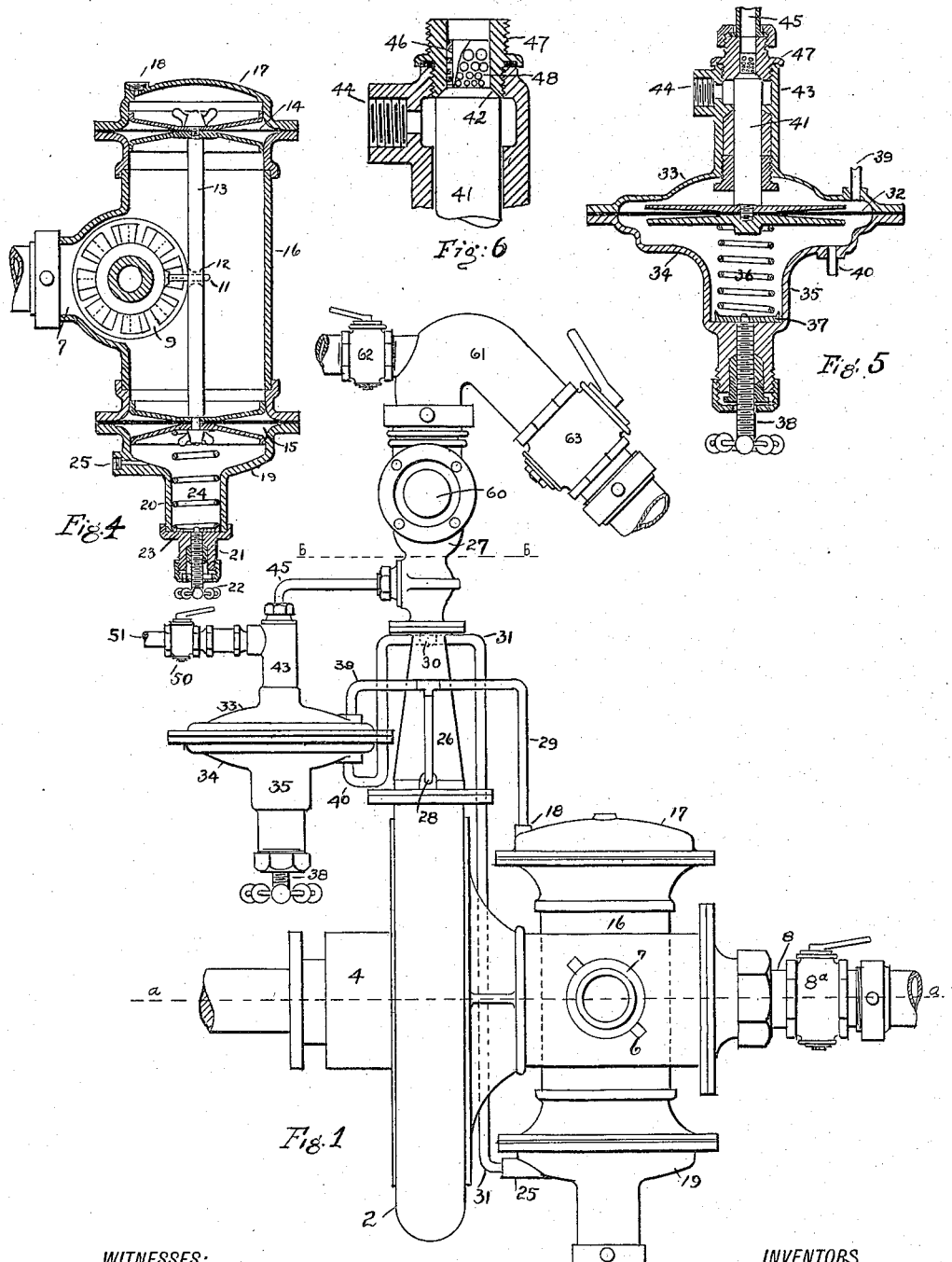
Figure 2:
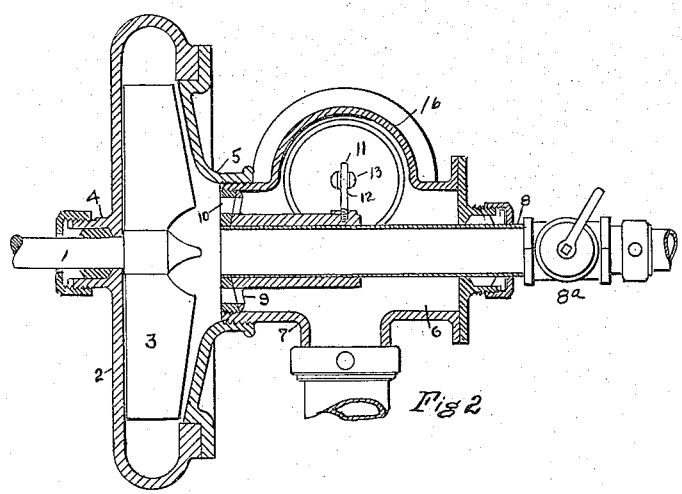
Figure 3:
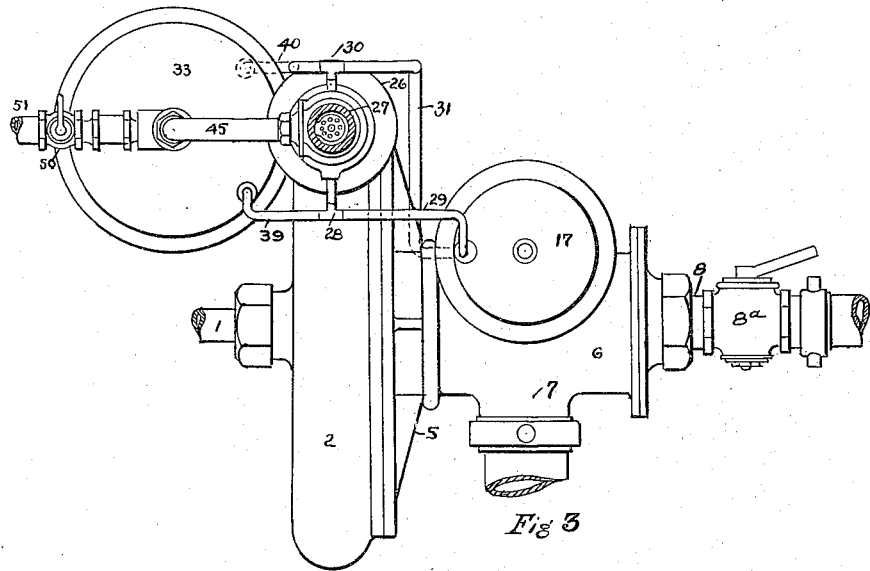

Figure 1 is a side view of our improved pump. Fig. 2 is a horizontal sectional view on the line *a—a* of Fig. 1. Fig. 3 is a horizontal view on the line *b—b* of Fig. 1. Fig. 4 is a vertical sectional view through the diaphragm for operating the grid-iron valve. Fig. 5 is a vertical sectional view through the diaphragm mechanism for the gas valve. Fig. 6 is a detail view of the gas valve.

The pump shown is a centrifugal pump and has a shaft 1 which is driven by a suitable motor, preferably an electric motor. Within a substantially circular pump casing 2 a series of radial blades 3 are fixed upon the shaft 1 which passes through a suitable stuffing box 4 on the pump casing 2. On that side of the pump casing 2 opposite the one provided with the stuffing box we provide a central inlet neck 5 for the liquid, which inlet neck 5 communicates with a tubular inlet casing 6 from which a liquid supply neck 7 projects laterally. A gas supply tube 8 provided with a valve 8$^a$ extends longitudinally and centrally through the inlet casing 6 and terminates in the center of the inlet neck 5 on the pump casing 2. Within the casing 6 this tube 8 is surrounded by a grid-iron valve 9 which can close, more or less, a series of ports 10 arranged radially in the inner end wall of the casing 6, said grid-iron valve having an arm 11 which is passed through a longitudinal slot 12 in a stem 13, having its opposite ends secured to diaphragms 14 and 15 held respectively in the top and bottom of a chamber 16, which communicates with the inlet casing 6 as shown. The upper diaphragm 14 is held in place by a cap 17 provided with an inlet neck 18 and the lower diaphragm 15 is held in place by a cap 19 having a neck 20 which in turn is closed by a box 21 through which an adjusting screw 22 is screwed, carrying at its inner end a plate 23 upon which rests the lower end of a helical spring 24 in the neck 20, the upper end of which spring exerts an upward pressure on the lower diaphragm 15.

The grid-iron valve 9, by opening the ports 10, more or less, controls the flow of liquid from the neck 7 through the casing 6 to the pump-casing 2. The bottom cap 19 is provided with a lateral neck 25. The outlet for the pump-casing 2 is at the top, and over the same a chamber 26 is secured, the transverse area of which is greater at its lower inlet end than at its upper outlet end and which by preference is made conical. With the upper end of the chamber 26 the delivery neck 27 for the commingled liquid and gas is connected and this neck may be provided with any further connections, such as a side glass 60, a neck 61 having controlling cocks 62 and 63 for conducting the mixture of gas and liquid to a racking device or to a cooler, filter or other receptacle, commonly used in breweries. A tube 28 extends laterally from the larger cross section area part of the chamber 26 and a branch tube 29 leads from said lateral tube 28 to the neck 18 on the top cap 17 of the chamber 16. A tube 30 projects laterally from that end of the chamber 26 having the lesser cross section area and from it a branch tube 31 leads to the neck 25 in the bottom cap 19 of the chamber or vessel 16, below the diaphragm 15.

A diaphragm 32 is held between two caps 33 and 34, the latter terminating in a downwardly extending neck 35 containing a spring 36 which bears with its upper end on the underside of the diaphragm 32, the lower end of said spring resting on a plate 37 on an adjusting screw 38 screwed through the bottom end cap of the neck 35 so that by turning said screw the tension of the spring 36 can be adjusted. A branch tube 39 leads from the tube 28 at the greater cross section area end of the chamber 26, to the top cap 33 of the diaphragm 32, and a branch tube 40 leads from the laterally projecting tube 30 to the bottom cap 34 of the diaphragm 32. The top cap 33 of the diaphragm 32 contains a vertically movable valve 41, the beveled upper end of which can seat on the valve seat 42 formed in the upper end of a neck 43, surrounding the valve 41, said valve 41 being connected with the diaphragm 32. Near its lower end the valve is suitably packed. At the upper end of the neck 43 a lateral neck 44 is provided which may be coupled with an inlet tube for gas under high pressure. The outlet tube for the gas controlled by the valve 41 is connected with the top cap 47 of the neck 43 and is marked 45. On the upper end of the valve 41 and above the beveled portion that can seat on the seat 42 a tubular extension 46 is provided which fits tight in the cap 47 which tubular extension is provided with a series of superimposed horizontal circumferential rows of apertures 48. We have shown four rows of apertures gradually increasing in size from the lowermost row to the uppermost row and at the same time decreasing in number, so that the effective area of opening of all of the apertures in any one circumferential row conjunctively is the same as the effective area of opening of the apertures in any other row.

The operation is as follows: In case the beer is to be charged or super-charged with compressed fermentation gas of a higher pressure, that is, at a pressure greater than that which is ordinarily evolved with safety and success during and by fermentation, the supply of gas to the inlet neck of the gas supply tube 8 is closed in any suitable manner, and the gas cock 50 in the high pressure gas supply pipe 51 is opened. The screw 22 is turned so as to force the stem 13 upward to such an extent that the grid-iron valve 9 opens the ports 10 to their full capacity. The screw 38 is then turned so as to adjust the spring 36 in accordance with the gas required for the quantity of beer to be delivered for a unit of time. The gas entering through the pipe 51 passes into the neck 27 through which the beer flows from the chamber of varying area 26. If the pressure of the beer, as it arrives at the pump is decreased for some reason and the flow of beer through the rotary pump is decreased the difference in pressures due to the velocity of the flow of liquid in the chamber 26 of varying area in cross section will also be reduced and as this reduction takes place in the proportion of the square of the velocity the spring 36 can force up the diaphragm 32 to a greater extent and thus the effective outlet area through the perforated tube extension 46 of the valve 41 is reduced. If, on the other hand, the pressure on the column of beer delivered to the pump increases, the velocity of flow in the chamber 26 increases and the difference in pressures is increased with the result that the downward pressure on the diaphragm is increased to such an extent that it lowers the valve 41, and thus openings are provided for a greater outlet for the beer. It may be necessary or desirable to control the flow of both the beer and the compressed gas. The supply of gas to the tube 8 remaining closed, the diaphragms 14 and 15 then regulate the flow of beer to the pump and the diaphragm 32 regulates the flow of gas in the manner previously described, the diaphragms being moved in one direction or the other by the liquid pressures brought to act upon them from the chamber of varying areas 26 in the manner previously set forth.

In case the gas to be commingled with the liquid is fermentation gas under available fermentation pressure, the gas supply pipe is coupled to the gas delivery tube 8 passing through the casing 6 so that the gas will be delivered at the center of the rotating blades 3 of the centrifugal pump. The screw 22 is then turned so as to adjust the spring 24 at a tension which will hold the grid-iron valve in a position to close the ports 10 commensurate with the quantity of beer to be delivered to the pump per unit of time. When the supply of beer and gas are turned on and the pump shaft 1 is rotated the rotating blades 3 will throw the beer outward toward the circumference of the pump casing 2 and out through the outlet chamber 26, whereby a suction is produced in the vicinity of the central axis of the pump and at the combined inflow of the gas and the beer into the pump. The gas pressure is maintained substantially uniform throughout. As soon as the current of beer and the gas mixed therewith passes to the chamber 26 of varying area in cross section the velocity of this stream of fluid mixture is automatically increased with the result that there is a different pressure in the lateral tube 28 at the larger cross sectional area of the chamber 26 from that existing at the reduced cross sectional area of said chamber, namely at the tube 30, all owing to the well known principle that when a liquid flows through a chamber or conduit of varying area in cross section, that is, if the area is less at the outlet than at the inlet end, the pressure is reduced at the outlet end, and this reduction of pressure is approximately as the square of the velocity. The lesser pressure exists at the lateral tube 30, which by means of the tube 31 is connected with the cap 19 below the diaphragm 15 and the greater pressure exists at the lateral tube 28 and is communicated through the tube 29 to the cap 17 above the diaphragm 14. As long as there is no variation in the flow of beer delivered to the pump and there being no substantial variation in the constant delivery of gas, no changes in position in the controlling gridiron valve are made, but if for some reason or other the flow of beer to the grid-iron valve is reduced, that is, the pressure of the beer is reduced and consequently the quantity and flow or current of commingled beer and gas delivered by the centrifugal pump is also reduced, it follows that there will be a reduction of pressure in the chamber 26 of varying area in cross section and as this difference in pressure is proportional to the square of the velocity and is thus much greater at the end of larger cross sectional area of the chamber 26 than it is at the end of lesser cross sectional area, it follows that the pressure on the lower diaphragm 15 will be increased beyond what it was just previously and the grid-iron valve will be turned slightly so as to open the ports 10 to a greater extent and furnish larger flow openings for the beer, temporarily under reduced pressure, until the equilibrium is again obtained when the excess pressure is removed from below the diaphragm 15 and the pressure on the diaphragm 14 can again bring the grid-iron valve to the original position. Likewise when the pressure of the beer is too great, greater pressure will be exerted on the upper diaphragm sufficiently to force the same downward against the pressure of the spring 24, and the pressure exerted on the diaphragm 15 and thus the effective area of the beer inlet ports is reduced commensurate with the increased pressure of the beer.

It may sometimes occur that when charging beer with a low pressure or fermentation gas and controlling the mixture by means of the grid-iron valve that the supply of gas is not sufficient to charge the beer to the desired or required extent and more gas must be admitted. In that case the tension of the diaphragm 32 is so adjusted as to admit a greater or less quantity of compressed gas through the pipe 45 into the column of partly charged beer delivered from the pump, the valve 41 being controlled by the diaphragm 32 in the manner previously described, so that in such case the differences in pressure in the chamber 26 at the same time control the diaphragm valve and also the gas valve 41.

It should be noted that when the gas of comparatively low pressure is used the gas is delivered into the pump at the center and commingled with the liquid in the pump casing, whereas when the high pressure gas is used the gas is delivered directly into the stream of beer passing through the neck 27.

Having described our invention what we claim as new and desire to secure by Letters Patent is:—

1. The combination with a conduit for conducting liquid, of a chamber communicating with said conduit and having different areas in cross section in different parts of its length, a conduit for delivering gas, which is to be commingled with the liquid in said liquid conduit, a valve for controlling the uniform mixture of liquid and gas by controlling the flow of gas, a diaphragm mechanism for shifting said valve, and separate conduit connections from parts of different cross sections of said chamber to opposite sides of said valve operating mechanism, substantially as set forth.

2. The combination with a conduit for conducting liquid, of a chamber communicating with said conduit and having a different cross section at its inlet end from that at its outlet end, a conduit for delivering gas, which is to be commingled with the liquid in said liquid conduit, a valve for controlling the uniform mixture of liquid and gas by controlling the flow of gas, a diaphragm mechanism for shifting said valve, and separate conduit connections from different parts of different cross sections of said chamber to opposite sides of said valve operating mechanism, substantially as set forth.

3. The combination with a pump, of a conduit for delivering a flow of liquid to the pump, a conduit having a varying area in cross section, another conduit for delivering gas to the pump, a valve for controlling the flow of gas to the pump, a diaphragm mechanism for shifting said valve, separate conduits extending from that part of the conduit of varying cross sections having the greater cross section and from that part having the lesser cross section to opposite sides of said diaphragm mechanism, substantially as set forth.

4. The combination with a conduit for conducting liquid, of a chamber communicating with said conduit having different areas on the cross section in different parts of its length, a conduit for delivering gas which is to be commingled with the liquid in said liquid conduit, a valve for controlling a uniform mixture of liquid and gas by controlling the flow of liquid, a valve for controlling the supply of gas delivered to said flow of liquid, a diaphragm mechanism for shifting said liquid controlling valve, another diaphragm mechanism for controlling the gas valve and separate conduit connections from parts of different cross sections of said chamber to the opposite sides of the mechanism for shifting the liquid controlling valve and to opposite sides of the mechanism for shifting the gas controlling valve, substantially as set forth.

Signed at New York City in the county of New York and State of New York this 28th day of July, A. D. 1914.

JACOB F. WITTEMANN.
RUDOLPH W. WITTEMANN.

Witnesses:
ED. EIRT,
JOS. C. KUHN.

Copies of this patent may be obtained for five cents each, by addressing the "Commissioner of Patents, Washington, D. C."